US011553561B2

(12) United States Patent
Malthankar et al.

(10) Patent No.: US 11,553,561 B2
(45) Date of Patent: *Jan. 10, 2023

(54) PROTECTION OF THE UE IDENTITY DURING 802.1X CARRIER HOTSPOT AND WI-FI CALLING AUTHENTICATION

(71) Applicant: Apple Inc., Cupertino, CA (US)

(72) Inventors: Rohan C. Malthankar, San Jose, CA (US); Paresh B. Sawant, Fremont, CA (US); Delziel J. Fernandes, San Jose, CA (US); Sergey Sitnikov, San Jose, CA (US); Arun G. Mathias, Los Altos, CA (US); Jason A. Novak, San Francisco, CA (US); Krisztian Kiss, Hayward, CA (US); Rafael L. Rivera-Barreto, Santa Clara, CA (US); Chandiramohan Vasudevan, San Jose, CA (US); Vladimir M. Appel, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 17/074,549

(22) Filed: Oct. 19, 2020

(65) Prior Publication Data

US 2021/0037604 A1    Feb. 4, 2021

Related U.S. Application Data

(63) Continuation of application No. 15/793,169, filed on Oct. 25, 2017, now Pat. No. 10,833,876.
(Continued)

(51) Int. Cl.
H04W 88/06    (2009.01)
H04W 12/06    (2021.01)
(Continued)

(52) U.S. Cl.
CPC ......... *H04W 88/06* (2013.01); *H04W 12/037* (2021.01); *H04W 12/0471* (2021.01);
(Continued)

(58) Field of Classification Search
CPC ... H04W 88/06; H04W 76/12; H04W 12/037; H04W 12/0471; H04W 12/06; H04W 84/12; H04L 2101/654
See application file for complete search history.

(56) References Cited

U.S. PATENT DOCUMENTS 7,546,459 B2 * 6/2009 Robles .................. H04L 9/321
713/168
7,617,524 B2 * 11/2009 Haverinen .......... H04L 63/1458
726/6
(Continued)

FOREIGN PATENT DOCUMENTS

CN    1714542 A    12/2005
CN    103415010 A    11/2013
(Continued)

OTHER PUBLICATIONS

Universal Mobile Telecommunications System (UMTS); LTE; 3G Security; Wireless Local Areal Network (WLAN) Interworking Security; 3GPP TS 33.234 V13.0.3 Release 13; 100 pages; Jan. 2016.

*Primary Examiner* — Hee K Song
(74) *Attorney, Agent, or Firm* — Kowert, Hood, Munyon, Rankin & Goetzel, P.C.

(57) ABSTRACT

This disclosure relates to techniques for performing Wi-Fi authentication in a wireless communication system. Public key cryptography may be used to enhance the confidentiality of the user's permanent identity in transit. In some embodiments, a RSA-OAEP(SHA-256) encryption scheme may be used to protect the permanent identity when the EAP client needs to send the user's permanent identity to the server in
(Continued)

the absence of pseudonym or fast re-authentication identity. In some embodiments, a server certificate is used to authenticate a iWLAN tunnel to protect an IMSI during setup of a Wi-Fi call. Using the methods described herein on both or either of the EAP client and server side may offer improved privacy protection.

20 Claims, 9 Drawing Sheets

Related U.S. Application Data

(60) Provisional application No. 62/414,517, filed on Oct. 28, 2016, provisional application No. 62/527,538, filed on Jun. 30, 2017.

(51) Int. Cl.
*H04W 76/12* (2018.01)
*H04W 12/037* (2021.01)
*H04W 12/0471* (2021.01)
*H04W 84/12* (2009.01)
*H04L 101/654* (2022.01)

(52) U.S. Cl.
CPC ........... *H04W 12/06* (2013.01); *H04W 76/12* (2018.02); *H04L 2101/654* (2022.05); *H04W 84/12* (2013.01)

(56) References Cited

U.S. PATENT DOCUMENTS

| | | | |
|---|---|---|---|
| 8,245,039 B2 * | 8/2012 | Jones | H04L 9/3236 713/168 |
| 8,611,543 B2 | 12/2013 | Falk et al. | |
| 10,425,448 B2 * | 9/2019 | Tevlin | H04W 12/069 |
| 2006/0101273 A1 | 5/2006 | Tan et al. | |
| 2006/0294363 A1 * | 12/2006 | Bae | H04L 63/0892 713/153 |
| 2008/0254833 A1 * | 10/2008 | Keevill | H04L 12/5692 455/558 |
| 2010/0185849 A1 * | 7/2010 | Rune | H04L 9/3265 713/156 |
| 2010/0199332 A1 * | 8/2010 | Bachmann | H04L 63/164 370/252 |
| 2011/0225632 A1 | 9/2011 | Ropolyi et al. | |
| 2012/0265888 A1 | 10/2012 | Roeland et al. | |
| 2013/0097674 A1 * | 4/2013 | Jindal | H04W 12/068 709/227 |
| 2013/0329653 A1 | 12/2013 | Russell, Jr. et al. | |
| 2013/0329654 A1 * | 12/2013 | Zakrzewski | H04W 4/70 370/329 |
| 2014/0115676 A1 * | 4/2014 | Coghlan | H04W 12/069 726/6 |
| 2017/0055153 A1 * | 2/2017 | Fransen | H04W 48/08 |
| 2017/0070880 A1 * | 3/2017 | Hahn | H04W 12/02 |
| 2017/0078333 A1 * | 3/2017 | Tevlin | H04W 12/069 |
| 2018/0054730 A1 * | 2/2018 | Hong | H04W 72/0453 |
| 2019/0007376 A1 * | 1/2019 | Norrman | H04L 63/0876 |

FOREIGN PATENT DOCUMENTS

| | | |
|---|---|---|
| CN | 104540136 A | 4/2015 |
| IN | 04076CH2013 A | 6/2016 |
| WO | 2016076634 A2 | 5/2016 |

* cited by examiner

PROTECTION OF THE UE IDENTITY DURING 802.1X CARRIER HOTSPOT AND WI-FI CALLING AUTHENTICATION

PRIORITY CLAIM

This application is a continuation of U.S. patent application Ser. No. 15/793,169, entitled "Encrypted IMSI Based Solution for 802.1x Carrier Hotspot and Wi-Fi Calling Authentication," filed Oct. 25, 2017, which claims priority to U.S. provisional patent application Ser. No. 62/414,517, entitled "Encrypted IMSI Based Solution for 802.1x Carrier Hotspot and Wi-Fi Calling Authentication," filed Oct. 28, 2016, and U.S. provisional patent application Ser. No. 62/527,538, entitled "Protection of the UE Identity During 802.1x Carrier Hotspot and Wi-Fi Calling Authentication," filed Jun. 30, 2017, which are all hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, including techniques for performing Wi-Fi authentication in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content. There exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

The EAP-AKA and EAP-SIM protocols are used along with 802.1X to authenticate client access to carrier Wi-Fi hotspots. The protocols are also used with IKEv2/IPsec tunneling to provide access to a carrier's internal network to enable features such as Wi-Fi calling.

Both EAP-AKA and EAP-SIM make use of the International Mobile Subscriber Identity (IMSI) as the permanent identity in the authentication exchange. The IMSI is a unique identifier that can be used to track device movement. To protect user privacy, improvements in the field of IMSI protection may be desirable.

SUMMARY

Embodiments described herein relate to systems, apparatuses, and methods for providing an identity privacy support mechanism for International Mobile Subscriber Identity (IMSI) transfer in an authentication exchange.

Some embodiments relate to a wireless device that includes one or more antennas, one or more radios, and one or more processors coupled (directly or indirectly) to the radios. At least one radio is configured to perform Wi-Fi communications. The wireless device may perform voice and/or data communications, as well as the methods described herein.

Some embodiments relate to an authentication server that includes one or more antennas, one or more radios, and one or more processors coupled (directly or indirectly) to the radios. At least one radio is configured to perform Wi-Fi communications. The authentication server may perform voice and/or data communications, as well as the methods described herein.

Embodiments contained herein propose a solution that eliminates the need for the EAP client to send a permanent identity "in the clear", i.e., without encryption. In some embodiments, public key cryptography may be used to achieve the confidentiality of the permanent identity. A wireless device may be configured with the public key of the authentication server so that it can encrypt the permanent identity before sending it to the server. The authentication server in the home environment of the carrier may be configured with the corresponding private key. When the server receives the encrypted permanent identity, it may be able to decrypt it using the private key. In some embodiments, encrypting the permanent identity may be employed at the EAP method layer.

In some embodiments, if the carrier deployment comprises multiple authentication servers, the proposal may assume that each of the nodes share the same key pair. In addition, the wireless device may provide the key identifier to help the authentication server locate the private key to decrypt the permanent identity. For example, the wireless device may be provided a certificate serial number of the server certificate as a key identifier to send to the authentication server.

In some embodiments, a UE may be configured to authenticate an iWLAN/IPsec tunnel with an ePDG while establishing a Wi-Fi call using a server certificate. In these embodiments, the UE may be preconfigured with one or more server certificates in a carrier settings file, which the UE can compare to a server certificate receive from the ePDG to determine that it is communicating with a valid ePDG and not an attacker.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
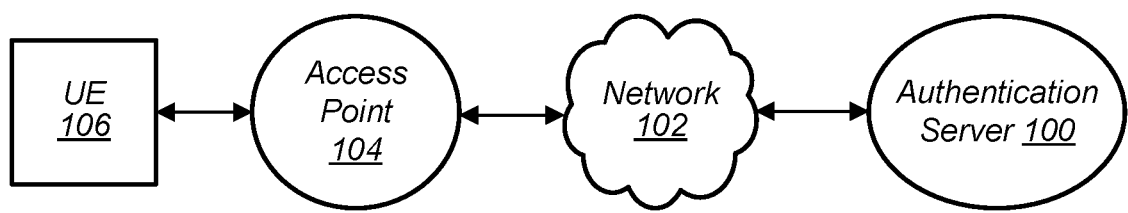
FIG. 1 illustrates an example wireless communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
BS: Base Station
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". The term "Wi-Fi" is used synonymously with WLAN. A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—Wireless Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a user device 106, which communicates in a wireless manner with an access point 104, where the access point 104 in turn is coupled via a network 102 to an authentication server (AS) 100. The user device may be referred to herein as a "user equipment" (UE). The network 100 may be, for example, a core network of a cellular service provider, a telecommunication network such as a public switched telephone network (PSTN), and/or the Internet, among various possibilities.

The AS 100 may include hardware that enables communication via the network with the access point 104. The AS 100 may configured to authenticate a communication session between the UE 106 and the access point 104, thus facilitating communication between the UE 106 and the network 102.

The AS 100 and the UE 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), etc.

Additionally, one or more access points (such as access point 104) may be communicatively coupled to the ASS 100 and the UE 106. These may include access points configured to provide a wireless local area network (WLAN) to support cellular network offloading and/or otherwise provide wireless communication services as part of the wireless communication system illustrated in FIG. 1. Such a WLAN may be configured to operate according to any of various communications standards, such as the various IEEE 802.11 (Wi-Fi) standards.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

Figure 5:
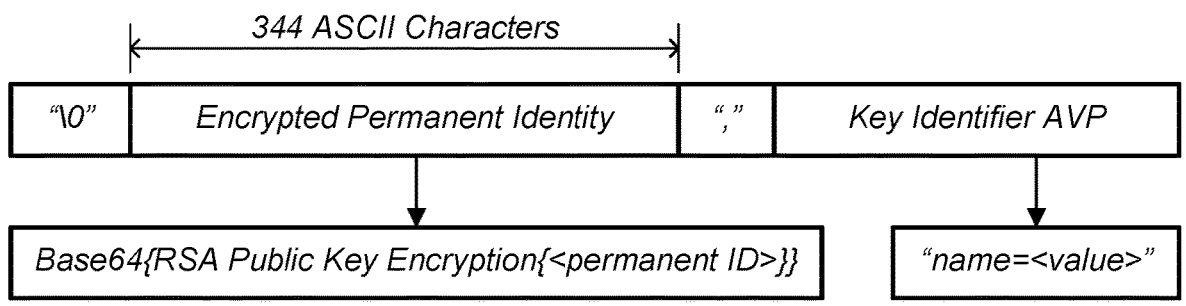
FIG. 5 illustrates an example composition of an encrypted permanent identity message, according to some embodiments.

Any or all of the network 102, authentication server 100, access point 104, and/or UE 106 illustrated in FIG. 1 may be configured to implement or support implementation of part or all of the methods described herein, including, inter alia, the method of FIG. 5.

In some embodiments, as further described below, a UE 106 may be configured to perform methods for performing Wi-Fi authentication for accessing a carrier network Wi-Fi access point using authentication information received from a server operated by the same carrier network.

Figure 2:
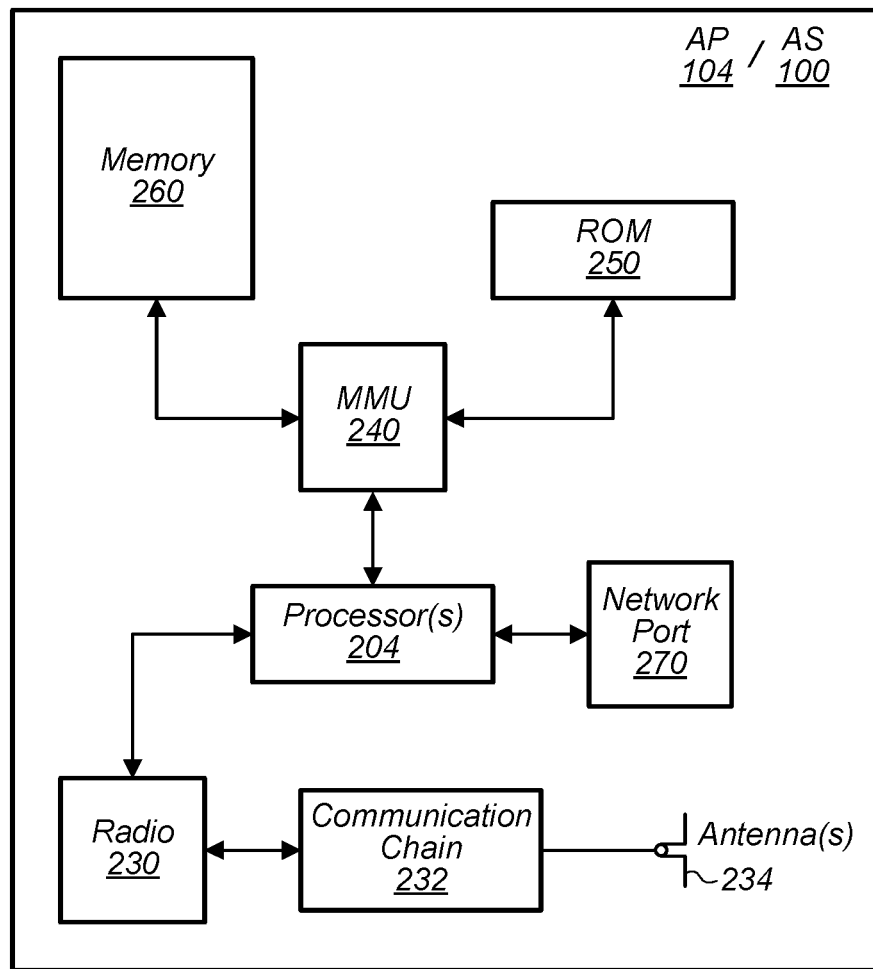
FIG. 2 illustrates an example simplified block diagram of an authentication server and/or access point device, according to some embodiments.

FIG. 2—Authentication Server/Access Point Block Diagram

FIG. 2 illustrates an example block diagram of access point (AP) 104. It is noted that the block diagram of the AP of FIG. 2 is only one example of a possible system. As shown, the AP may include processor(s) 204, which may execute program instructions for the AP. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP may include at least one network port 270. The network port 270 may be configured to couple to a wired network and provide a plurality of devices, such as UE 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP may include at least one antenna 234, which may be configured to operate as a wireless transceiver and may be further configured to communicate with a UE 106 via wireless communication circuitry 230. The antenna(s) 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11.

The AP may be configured to act as an access point to provide an infrastructure mode 802.11 network to wireless stations in the vicinity of the AP. Additionally or alternatively, the AP may be configured to act as a peer station to perform peer-to-peer communications with nearby wireless stations. In some embodiments, as further described below, AP may be configured to perform and/or support performance of methods for a wireless device to perform Wi-Fi authentication to access a carrier network Wi-Fi access point.

The authentication server (AS) 100 may be configured similarly to the access point 104. However, in some embodiments, the AS may not be configured with a radio 230, communication chain 232, or antenna(s) 234. In other words, the AS may communicate with the network 100 directly through its network port 270. Other embodiments involving an authentication server with wireless communication capabilities are also possible.

Figure 3:
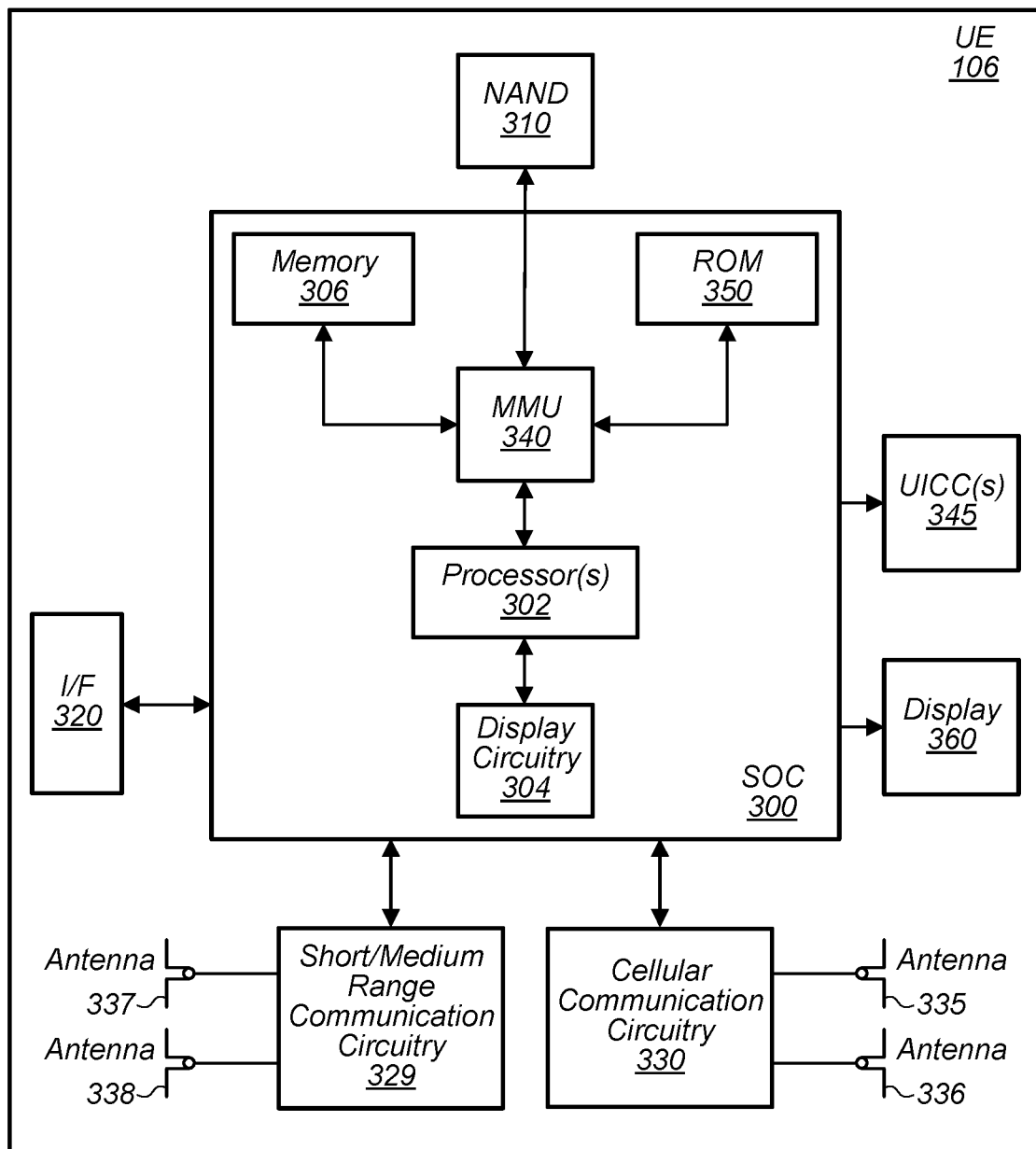
FIG. 3 illustrates an example simplified block diagram of a wireless user equipment device, according to some embodiments.

FIG. 3—UE Device Block Diagram

FIG. 3 illustrates an example simplified block diagram of a user equipment (UE) device, a mobile device or mobile station, and/or a wireless device or wireless station, which may be referred to herein as a UE 106 for simplicity. As shown, the UE 106 may include a system on chip (SOC) 300, which may include portions for various purposes. The SOC 300 may be coupled to various other circuits of the UE 106. For example, the UE 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The UE 106 may further include one or more smart cards that incorporate SIM (Subscriber Identity Module) functionality, such as one or more UICC(s) (Universal Integrated Circuit Card(s)) 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the UE 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the UE 106 may include hardware and software components for implementing the features described herein, for example including performing Wi-Fi authentication for accessing a carrier network Wi-Fi access point using an International Mobile Subscriber Identity (IMSI). For example, the processor 302 of the UE 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short/medium range wireless communication circuitry 329 may each include one or more processing elements. In other words, one or more processing elements may be included in cellular communication circuitry 330 and one or more processing elements may be included in short/medium range wireless communication circuitry 329. Thus, each of cellular communication circuitry 330 and short/medium range wireless communication circuitry 329 may include one or more integrated circuits (ICs) that are configured to perform the functions of cellular communication circuitry 330 and short/medium range wireless communication circuitry 329, respectively. In addition, each integrated circuit may include circuitry (e.g., first circuitry, second circuitry, etc.) configured to perform the functions of cellular communication circuitry 330 and short/medium range wireless communication circuitry 329.

Figure 4:
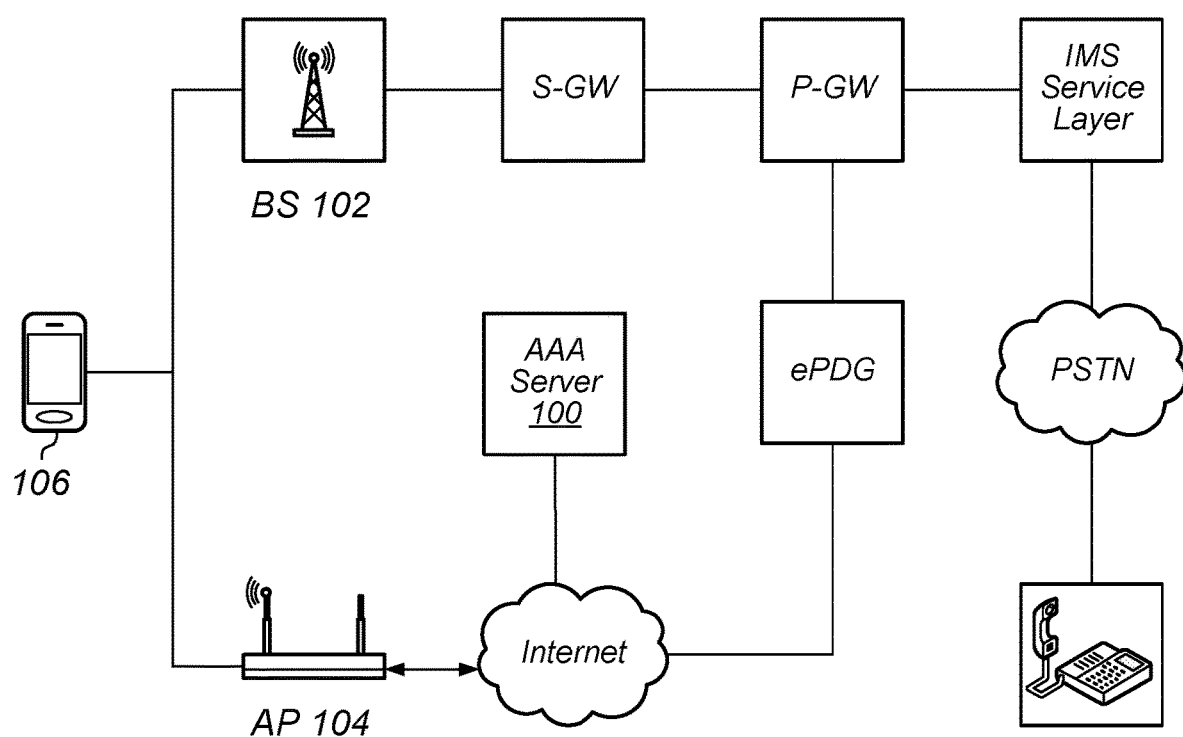
FIG. 4 illustrates an example wireless communication system for enabling Wi-Fi calling, according to some embodiments.

FIG. 4—Wireless Communication System for Wi-Fi Calling

FIG. 4 illustrates an example wireless communication system that may enable Wi-Fi calling according to some embodiments. As shown, the mobile device 106 may communicate with a cellular network via cellular base station 102. The cellular base station 102 may communicate with a Serving Gateway (SGW). The SGW is responsible for handovers with neighboring base stations. The SGW couples to a Packet Data Network (PDN) Gateway, or PGW. The PGW operates to interface between the cellular and WiFi networks. Together the SGW and the PGW make be included within the evolved packet core (EPC).

As shown, mobile device 106 may also communicate with an access point (AP) 104, which in this embodiment may be a WiFi access point presenting a WiFi network. The AP may be configured to exchange EAP messages with the UE over EAPOL. The Wi-Fi access point 104 may couple through a network, such as the Internet, to an evolved Packet Data Gateway (ePDG). The ePDG is utilized in the network function of 4G mobile core networks, known as the evolved packet core (EPC) mentioned above, as well as future mobile networks, such as 5G networks. The ePDG may act as an interface between the EPC and non-3GPP networks that may use non-secured access, such as Wi-Fi and femto-cell access networks. In some embodiments, the ePDG may more generally be any type of Packet Data Gateway (PDG).

In some embodiments, the AP 104 and the ePDG may be further communicatively coupled, via the internet, with the AAA Server 100. The AP 104 may be configured to exchange EAP messages with the AAA Server over the RADIUS/DIAMETER protocol. In some embodiments, the ePDG may be configured to communicate with the AAA Server 100 (e.g., through the internet), to facilitate an authentication process between the UE and the AAA Server 100 (e.g., in the case of Wi-Fi calling). In other embodiments, any combination of the AP 104, the AAA Server 100, and/or the ePDG may be collocated, so that the respective collocated components may be configured to communicate directly.

The PGW may couple to an IMS (IP Multimedia Subsystem) server. The IMS server may comprise a computer system with a processor and memory which performs various operations as described herein. The IMS server may implement an IMS Service Layer. The IMS server may also implement a Proxy Call Session Control Function (P-CSCF). The P-CSCF may act as the entry point to the IMS domain and may serve as the outbound proxy server for the mobile device. The mobile device may attach to the P-CSCF prior to performing IMS registrations and initiating SIP sessions. The P-CSCF may be in the home domain of the IMS operator, or it may be in the visiting domain where the mobile device is currently roaming.

The IMS server may couple to other networks such as the public switched telephone network (PSTN) or other types of communication networks, e.g., for communicating with other communication devices, such as a standard POTS telephone (shown), another mobile device, etc.

Client Access Authentication

When a user of UE desires to connect to a Wi-Fi hotspot (Wi-Fi access point), typically the user is required to authenticate his identity, e.g., to determine if the UE is an authorized UE of the Wi-Fi network. The EAP-AKA (Extensible Authentication Protocol—Authentication and Key Agreement) and EAP-SIM (Extensible Authentication Protocol—Subscriber Identity Module) protocols are used along with 802.1X to authenticate client access to carrier Wi-Fi hotspots. The protocols are also used with IKEv2/IPsec tunneling to provide access to a carrier's internal network to enable features such as Wi-Fi calling.

Both EAP-AKA and EAP-SIM make use of the International Mobile Subscriber Identity (IMSI) as the permanent identity in the authentication exchange. The IMSI is a unique identifier that can be used to track device movement. Protecting the IMSI against untrusted exposure may be important to protect user privacy.

Both EAP-SIM and EAP-AKA provide a way to hide the identity using a "pseudonym" on all but the first authentication exchange. This operation is described in RFC (Request for Comment) 4186 Section 12.2 for EAP-SIM, and RFC 4187 Section 12.1 for EAP-AKA. The server may generate a pseudonym for a client, associate it with the IMSI, and securely transmit the next pseudonym for the client to use on its next authentication attempt. The client may remember the pseudonym, and from that point forward, the client may continue to use the pseudonym and not the IMSI. As a result, any device that passively sniffs wireless traffic after the first exchange does not see the IMSI. Unfortunately, the usage of pseudonyms in this manner may not protect against active attacks.

In order to provide mitigation against active attack, the option of enabling a conservative peer mode was introduced. The conservative peer mode is described in section 4.1.6 of RFC 4187 and section 4.2.6 of RFC 4186. A conservative EAP peer enforces a configurable lifetime of the pseudonym which means it does not present the IMSI in response to server's request for permanent ID until the pseudonym lifetimes expires.

In some present implementations, some circumstances cause an EAP client to send its permanent identity in the clear. These circumstances may include, for example, when the EAP client does not have pseudonym or fast re-authentication identity, or when the EAP authentication server does not recognize the pseudonym presented by the EAP client and requests the permanent identity.

Because the permanent identity may never change, revealing it may help to gather information on the identity and location of the user. It is important to provide an identity privacy support mechanism that ensures that the EAP exchange never reveals the IMSI to passive or active attackers.

Encrypting the IMSI

In some embodiments, it may be advantageous to eliminate the need for the EAP client to send the permanent identity in the clear. The term "in the clear" here refers to a transmission with no encryption or scrambling mechanism in place for security purposes. The client may use the pseudonym or fast re-authentication identity when available, and may provide confidentiality of the permanent identity in other circumstances when it is required by the server.

Embodiments described herein relate to systems, apparatuses, and methods for providing an identity privacy support mechanism for IMSI transfer in an authentication exchange.

In some embodiments, public key cryptography may be used to achieve the confidentiality of the permanent identity. A wireless device may be configured with the public key of the authentication server so that it can encrypt the permanent identity before sending it to the server. The authentication server in the home environment of the carrier may be configured with the corresponding private key.

When the server receives the encrypted permanent identity, it may be able to decrypt it using the private key. In some embodiments, if the carrier deployment consists of multiple authentication servers, it may be assumed that each of the nodes share the same key pair. In addition, the wireless device may provide the key identifier to help the authentication server locate the private key to decrypt the permanent identity. For example, the wireless device may be provided a certificate serial number of the server certificate as a key identifier to send to the authentication server.

In some embodiments, if the authentication server fails to decrypt the IMSI, the server may be configured to send an EAP-Request/AKA Notification packet with and AT_NOTIFICATION code "General failure" (16384), to terminate the EAP exchange. This may be desirable, for example, to indicate to the EAP client that the server was unable to decrypt the IMSI, so the EAP client may take appropriate measures (as explained in further detail below) to update its public key. Further detail describing this process may be found at, e.g., RFC 4187, Section 4.1.7.

Encrypting the permanent identity may be employed at the EAP method layer. In this case, the authentication server may have to rely on client identity determination supported at the EAP-AKA or EAP-SIM layer. For example, in case of EAP-AKA, the authentication server may use an EAP-Request/AKA-Identity message to get the client's identity. The EAP-Response/AKA-Identity may reveal the NAI realm to enable routing the packet to the correct authentication server.

Mechanism to Configure the Public Key

In the embodiments described above, the UE may be required to be initially pre-configured with a public key in the carrier bundle. Additionally, the carrier may choose to use a Key Identifier. The UE may continue to use the public key configured in the bundle until it receives an updated one from the carrier hosted server. In some embodiments, the UE may check periodically against the carrier hosted server using HTTPS (hypertext transfer protocol secure) to check if the public key has been updated. In some embodiments, the URL (uniform resource locator) for the carrier hosted server may also be included in the carrier bundle.

FIG. 5—Example Composition of an Encrypted Permanent Identity Message

FIG. 5 shows an exemplary encoding format that may be used by the UE and the authentication server to encrypt an IMSI or other permanent identity. The encoding format may be usable by the authentication server to distinguish between encrypted and unencrypted permanent identities.

The first ASCII (American Standard Code for Information Interchange) character in the message shown in FIG. 5 ("\0" as shown) may take on any of the following values, with the following implications:

"\0" (ASCII NULL character)=>encrypted IMSI
"0" (ASCII value 30 hexadecimal)=>EAP-AKA IMSI
"1" (ASCII value 31 hexadecimal)=>EAP-SIM IMSI
"6" (ASCII value 36 hexadecimal)=>EAP-AKA' IMSI As is known to those of skill in the art, the EAP-AKA' protocol may be similar to EAP-AKA in many respects, but with better security. In some embodiments, the Encrypted Permanent Identity may be encoded. This field may follow the first ASCII character only when the first character is "\0". This data may represent base64 encoded encrypted permanent identity. With an RSA (Rivest, Shamir, and Adelman) key size of 2048 bits and RFC 4648 compliant Base64 encoding, this data may be represented by 345 ASCII characters.

In some embodiments, a Key Identifier Attribute Value Pair (AVP) may be encoded. The Key Identifier AVP may represent data that helps the server locate the private key to decrypt the permanent identity. This field may be optional and if it is present then it may be separated from the encrypted permanent identity with the "," (ASCII comma) character. The Key identifier AVP may be presented in the ASCII string with the "name=value" format ending with a null character. For example, if the client wants to send the certificate serial number to the authentication server, it may be formatted as "CertificateSerialNumber=12345".

When neither a pseudonym nor a fast re-authentication identity is available, the EAP client may use an anonymous username decorated with an appropriate NAI (Network Access Identifier) realm in the EAP-Response/Identity packet. In some embodiments, the format of the anonymous username may be anonymous@<NAI-realm>.

On receiving an EAP-Request/AKA-Identity packet from server, the client may send the encrypted permanent identity with the NUL ASCII character ("\0") as a prefix character. The EAP client may form a buffer containing the permanent username and may encrypt the buffer using the RSA public key of the authentication server. The EAP client may use the RSA-OAEP (RSA-Optimal Asymmetric Encryption Padding) encryption scheme to encrypt the permanent identity which may guarantee the encrypted username is unique each time it is generated, and may avoid creating another persistent and trackable identifier for the user. This may, for example, obviate the need to rotate identities between clients.

In some embodiments, the RSA-OAEP encryption scheme with SHA-256 (Secure Hash Algorithm-256) hashing may be used. As described in section 7.1 of RFC 3447, with the RSA-OAEP encryption scheme, it may be computationally infeasible to obtain full or partial information about a message from a ciphertext, and computationally infeasible to generate a valid ciphertext without knowing the corresponding message. Therefore, a chosen-ciphertext attack may be ineffective against a plaintext-aware encryption scheme such as RSA-OAEP. The RSA key size of 2048 bits and SHA-256 hash function may support encryption of plaintext data of length up to 190 bytes.

In some embodiments, it may be desirable to explicitly communicate the identifier of the public key that the EAP client is using for encryption. In these embodiments, the client may populate the key identifier data along with the encrypted permanent identity. The EAP client may be configured with the name and value of the attribute in a printable string format so that it can send this data to the authentication server.

In some embodiments, an RSA key size of 2048 bits may be used, wherein the encryption buffer may be 256 bytes. Since EAP-AKA and EAP-SIM do not support fragmentation, use of a 2048 bit key size may be desirable to keep the size of the packet limited so that the maximum transfer unit (MTU) of the underlying lower layer is not exceeded. The client may then convert the buffer to printable characters using Base64 encoding of the encrypted bytes. The Base64 encoding may be done in compliance with section 4 of RFC 4648. The Base64 encoding on the encrypted data may provide a string of 345 ASCII characters.

In some embodiments, an authentication server may receive a pseudonym identity, fast re-authentication identity, a permanent identity in cleartext or an encrypted permanent identity in the AT_IDENTITY attribute of an EAP-Response/AKA-Identity packet. If the server supports the pseudonym or fast re-authentication identity, it may look up the received username in its pseudonym/fast reauthentication table. If a match is found, it may proceed with authentication using that identity. If no match is found, it may need to differentiate between an encrypted and unencrypted username. To differentiate between an encrypted and unencrypted IMSI, the server may use a mechanism that's based on section 4.1.16 of RFC 4187 and 4.2.1.6 of RFC 4186. The permanent username may be of the format <"0"|IMSI> for EAP-AKA, where the character "|" denotes concatenation, and for EAP-SIM it may be in the format <"1"|IMSI>. If a server finds the first character to be "0" or "1", it may know the IMSI is in plaintext and it may proceed reading the remaining digits of IMSI and continue with the authentication. But if the first character is "\0", then the server may know that the client has sent the encrypted data. The server may first read the string of 345 ASCII characters following the "\0" ASCII character. This string of 345 ASCII characters may be a Base64 encoded encrypted permanent identity. The first server may perform the Base64 decoding to get the encrypted data. If there is "," character found following the encrypted permanent identity data, the server may read the key identifier value using the encoding format describe above, and may use the key identifier to locate the private key. The server may run RSA decryption using the appropriate private key on the data to get the plaintext data which represents 16 character ASCII string. The format of the IMSI may follow the same formatting rules as specified in section 4.1.1.6 of RFC 4187 and 4.2.1.6 of RFC 4186.

Figure 6:
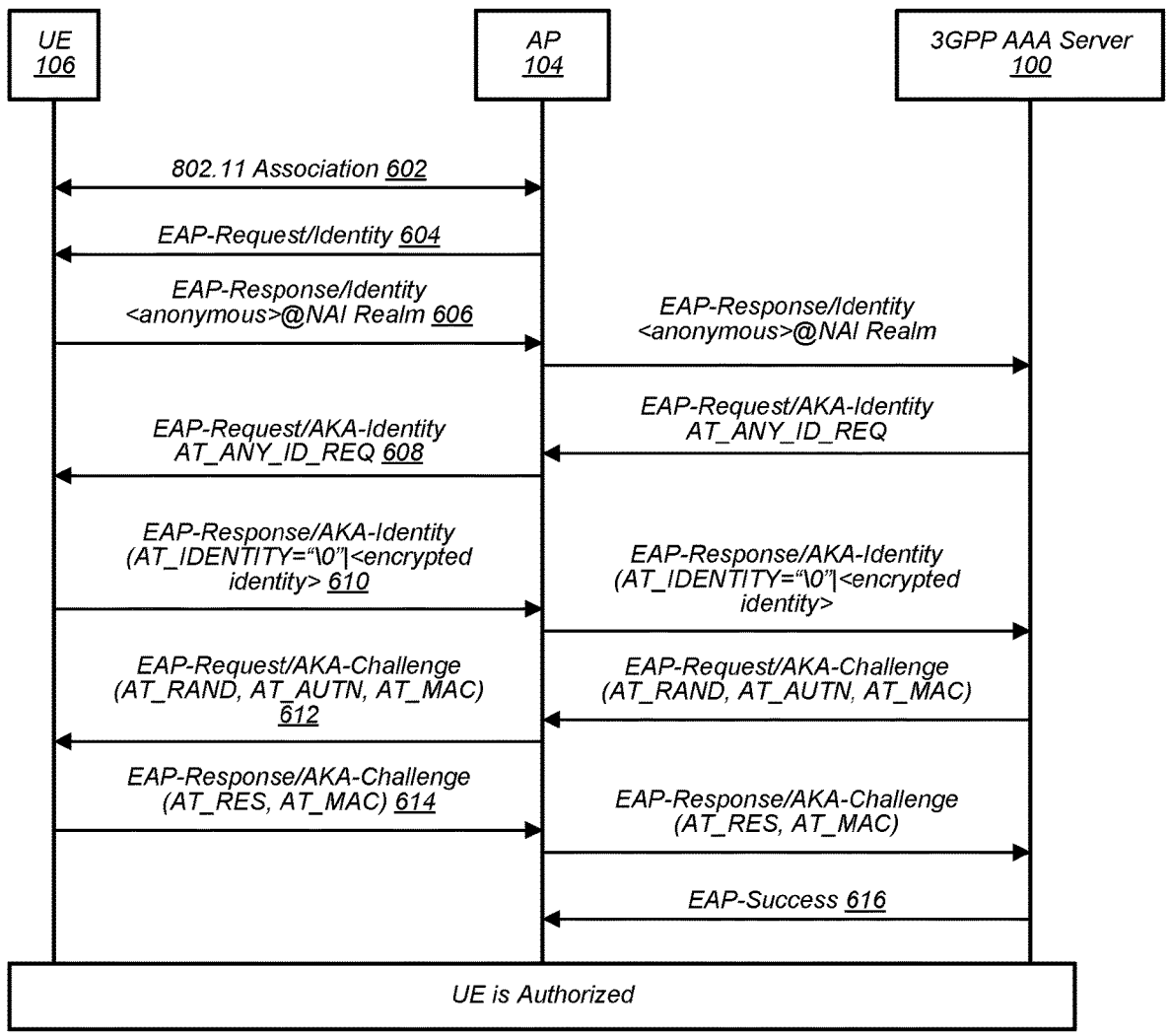
FIG. 6 is a communication flow diagram showing an exemplary EAP-AKA authentication process, according to some embodiments.

FIG. 6—EAP-AKA Authentication Process

FIG. 6 is an exemplary message flow showing EAP-AKA authentication. FIG. 5 is shown for the case of EAP-AKA authentication, but it may be appreciated by one of skill in the art how the methods of FIG. 6 may be adapted to EAP-SIM authentication.

At 602, an 802.11 connection (association) is made between the UE 106 and the WLAN access point 104. The UE may be used by an EAP client, in some exemplary embodiments. In some embodiments, the connection may be made by any of a variety of short range wireless communication technologies, such as Wi-Fi. For example, a user carrying a mobile device (or UE) may enter an area served by a Wi-Fi hotspot. The mobile device may detect a beacon transmitted by the Wi-Fi hotspot and may attempt to automatically connect to the Wi-Fi hotspot.

At 604, after the connection is made in 602, an EAP Request/Identity message is transmitted from the access point to the UE. The EAP Request/Identity message may serve to initiate an identity authentication process of the UE.

At 606, a EAP-Response/Identity packet may be transmitted by the UE via the WLAN access point to the 3GPP AAA Server 100. More particularly, the UE may transmit the EAP Response/Identity packet in a wireless fashion to the Wi-Fi access point, and in turn the Wi-Fi access point provides the EAP Response/Identity packet to the AAA server. The EAP Response/Identity packet may comprise an anonymous username starting with "0" or "1" to help the network route the EAP authentication to the appropriate AAA server that supports EAP-AKA or EAP-SIM, respectively. If it is desirable to use prefix values other than "0" or "1", this may be configured with the EAP client. For example, if the network needs the prefix to be "999" then this may be configured with the EAP client so that it may send a EAP-Response/Identity packet with identity "999"<anonymous>@<NAIrealm>. Use of this prefix value may be limited to the EAP-Response/Identity packet.

At 608, an EAP Request/AKA Identity packet may be transmitted by the 3GPP AAA Server via the WLAN access point to the UE. The EAP Request/AKA Identity packet may comprise an "AT_ANY_ID_REQ" attribute. The AT_ANY_ID_REQ attribute may request an encrypted IMSI from the UE.

At 610, an EAP Response/AKA Identity packet that contains the encrypted identity (e.g., an encrypted IMSI or another encrypted identity) may be transmitted by the UE via the WLAN access point to the 3GPP AAA Server. In the example shown in FIG. 6, the EAP Response/AKA Identity packet may comprise an AT_IDENTITY attribute, wherein the encrypted IMSI is communicated in the form AT_IDENTITY="\0"|<encrypted identity>.

At 612, an EAP Request/AKA Challenge packet comprising AT_RAND, AT_AUTN, and AT_MAC attributes may be transmitted by the 3GPP AAA Server via the WLAN access point to the UE. These attributes are part of standard EAP-AKA and EAP-SIM protocols, and descriptions thereof may be found in, e.g., RFC 4186 and RFC 4187.

At 614, an EAP Response/AKA Challenge packet comprising AT_RES and AT_MAC attributes may be transmitted by the UE via the WLAN access point to the 3GPP AAA Server. These attributes are part of standard EAP-AKA and EAP-SIM protocols, and descriptions thereof may be found in, e.g., RFC 4186 and RFC 4187.

At 616, an EAP Success message may be transmitted by the 3GPP AAA Server to the WLAN access point indicating the success of the authorization process, whereby the UE will become authorized.

Figure 7:
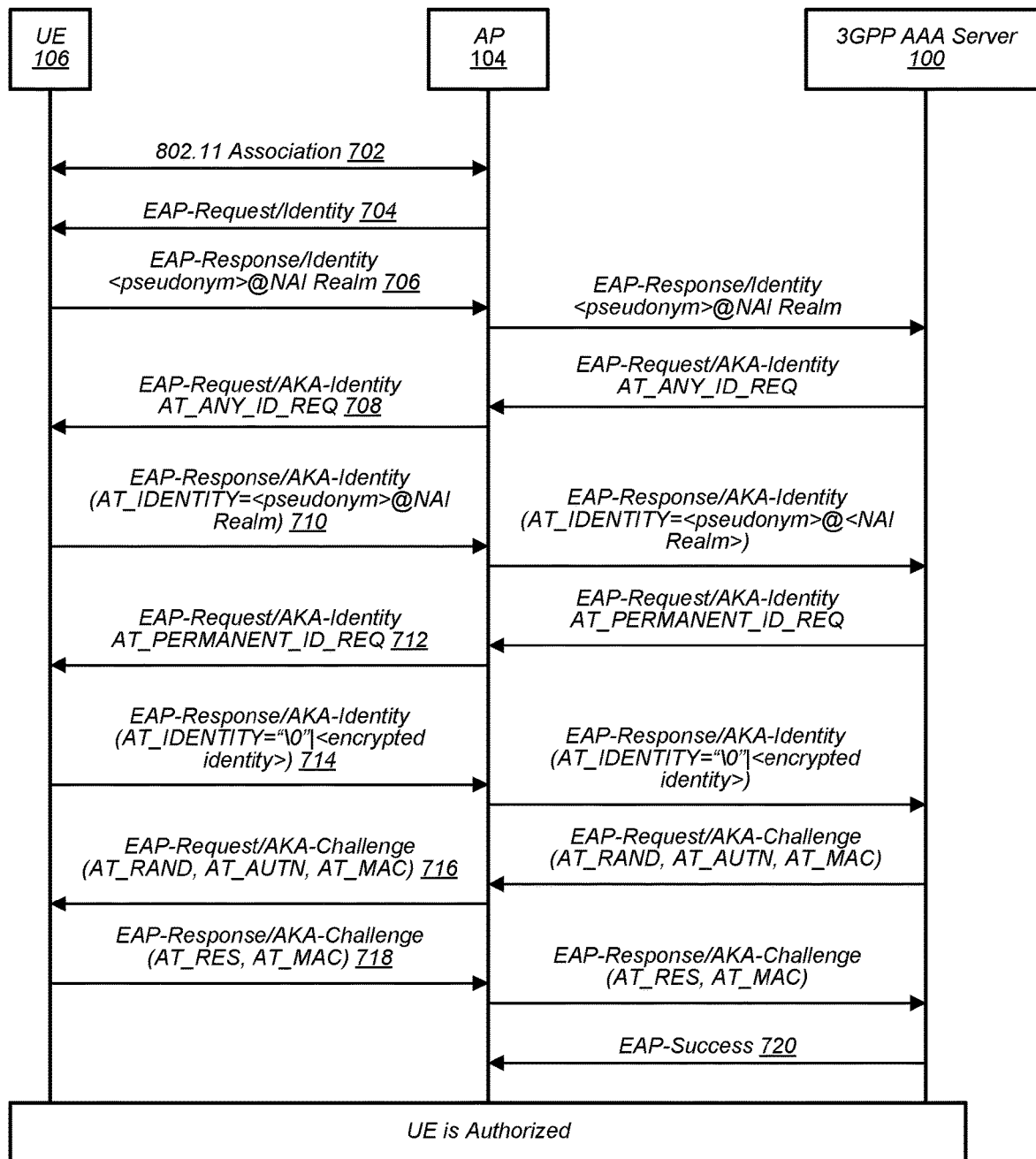
FIG. 7 is a communication flow diagram showing an exemplary EAP-AKA authentication process when the client has a pseudonym and the server requests a permanent identity, according to some embodiments.

FIG. 7—EAP-AKA Authentication Process with Pseudonyms

FIG. 7 is an exemplary message flow showing EAP-AKA authentication when the client has a pseudonym and the server requests a permanent identity. The client may have previously received the pseudonym from the authentication server during a previous authentication process. FIG. 7 is shown for the case of EAP-AKA authentication, but it may be appreciated by one of skill in the art how the methods of FIG. 7 may be adapted to EAP-SIM authentication.

At 702, an 802.11 connection is made between the UE 106 and the WLAN access point 104. The UE may be used by an EAP client, in some embodiments. In some embodiments, the connection may be made by any of a variety of short range wireless communication technologies, such as Wi-Fi.

At 704, an EAP Request Identity message is transmitted from the access point to the UE. The EAP Request Identity message may serve to initiate an identity authentication process of the UE.

At 706, an EAP Response/Identity packet is transmitted from the UE, via the access point, to the 3GPP AAA Server 100. The EAP Response/Identity packet may contain a pseudonym and may be configured to read <pseudonym>@<NAI Realm>.

At 708, an EAP Request/AKA Identity packet may be transmitted by the 3GPP AAA Server via the WLAN access point to the UE. The EAP Request/AKA Identity packet may comprise an "AT_ANY_ID_REQ" attribute. The AT_ANY_ID_REQ attribute may request an encrypted IMSI from the UE.

At 710, an EAP Response/AKA Identity packet that contains the pseudonym may be transmitted by the UE via the WLAN access point to the 3GPP AAA Server. In the example shown in FIG. 7, the EAP Response/AKA Identity packet may comprise an AT_IDENTITY attribute, wherein pseudonym is communicated in the form "AT_Identity=<pseudonym>@<NAI Realm>".

At 712, an EAP Request/AKA Identity packet may be transmitted by the 3GPP AAA Server via the WLAN access point to the UE. The EAP Request/AKA Identity packet may comprise an "AT_PERMANENT_ID_REQ" attribute. The AT_PERMANENT_ID_REQ attribute may comprise a request for an encrypted permanent ID from the UE. In some embodiments, the request for an encrypted permanent ID may be in response to the expiration of the pseudonym. In other embodiments, the request for an encrypted permanent ID may be in response to the 3GPP AAA Server not recognizing the pseudonym transmitted at step 706.

At 714, an EAP Response/AKA Identity packet that contains the encrypted identity (e.g., and encrypted IMSI or another encrypted identity) may be transmitted by the UE via the WLAN access point to the 3GPP AAA Server. The response at 714 may be an EAP Response/AKA Identity packet that may comprise an AT_IDENTITY attribute, wherein the encrypted IMSI is communicated in the form "AT_IDENTITY="\0"|<encrypted identity>".

At 716, an EAP Request/AKA Challenge packet comprising AT_RAND, AT_AUTN, and AT_MAC attributes may be transmitted by the 3GPP AAA Server via the WLAN access point to the UE. These attributes are part of standard EAP-AKA and EAP-SIM protocols, and descriptions thereof may be found in, e.g., RFC 4186 and RFC 4187.

At 718, an EAP Response/AKA Challenge packet comprising AT_RES and AT_MAC attributes may be transmitted by the UE via the WLAN access point to the 3GPP AAA Server. These attributes are part of standard EAP-AKA and EAP-SIM protocols, and descriptions thereof may be found in, e.g., RFC 4186 and RFC 4187.

At 720, an EAP Success message may be transmitted by the 3GPP AAA Server to the WLAN access point indicating the success of the authorization process, whereby the UE will become authorized.

Wi-Fi Calling Using IKEv2 Protocol

In some embodiments, Wi-Fi Calling by a UE uses the IKEv2 protocol to establish the IPSec tunnel with the Evolved Packet Data Gateway (ePDG). In these embodiments, the UE may be referred to as a IKEv2 client. In some embodiments, the IKEv2 exchange makes use of the International Mobile Subscriber Identity (IMSI) as the IKE identifier in the authentication exchange. Although the IKE identifier may be sent within the encrypted tunnel, the tunnel may not be authenticated. In this case, IKEv2 keys may be negotiated with an attacker. Once the keys are calculated, both the client and the attacker may have access to the keys to decrypt the IKEv2 session. If the client subsequently shares the IMSI with the attacker, using the encrypted IKEv2 tunnel, the attacker may easily decrypt this packet with the keys it previously calculated and extract the IMSI from the IKE AUTH packet. This exposes the IMSI to an active attacker.

In current implementations, the IKEv2 client may send the IMSI as the IKE identifier before authentication. Because the IMSI is a permanent identity and never changes, revealing it prior to authentication may enable passive and/or active attackers to gather information on the identity and location of the user. Embodiments described below provide an identity privacy support mechanism that ensures that the IKEv2 exchange never reveals the IMSI to passive or active attackers.

Figure 8:
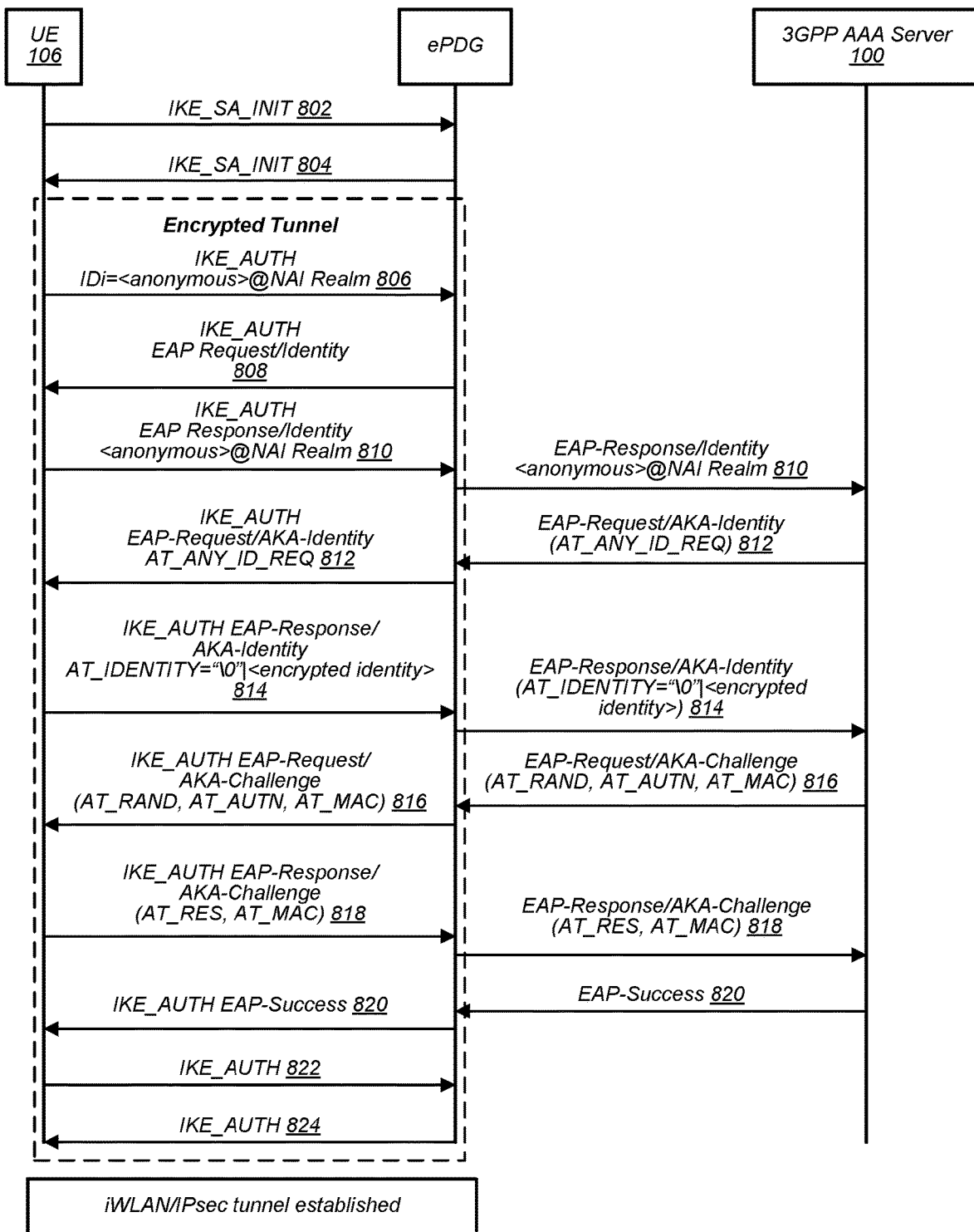
FIG. 8 is a communication flow diagram showing an exemplary identity protection process using an encrypted IMSI in the case of Wi-Fi calling, according to some embodiments.

FIG. 8—Encrypted IMSI for Wi-Fi Calling

FIG. 8 is an exemplary message flow showing identity protection using an encrypted IMSI in the case of Wi-Fi calling. In some embodiments, a user may be conducting a telephone call that would typically be accomplished over a cellular communication network. In this case, it may improve the user experience (i.e., because of a poor cellular signal, or to preserve cellular data) to instead convert voice signals into packets which are transmitted over the Wi-Fi network. Incoming voice signals may also be received as IP packets. The process of communicating a voice call by converting voice data into digital packets is commonly referred to as VoIP (Voice over Internet Protocol). The case where VoIP is performed via a Wi-Fi access point is commonly referred to as Wi-Fi calling. FIG. 8 is shown for the case of Wi-Fi calling using the EAP-AKA protocol, but it may be appreciated by one of skill in the art how the methods of FIG. 8 may be adapted to the EAP-SIM protocol.

In the case of Wi-Fi calling, a UE may already have established a secure connection at layer 2 of the networking stack with a WLAN access point. In this case, when initiating a Wi-Fi call, it may be necessary to perform an authentication procedure between the UE and the evolved packet data gateway (ePDG) at layer 3 of the networking stack.

At 802, an IKE_SA_INIT package may be transmitted by the UE 106 to the ePDG. A detailed description of the communication system between the UE and the ePDG may be found above in the description of FIG. 4. The UE may be used by an EAP client, in some embodiments. The IKE_SA_INIT package may serve to request an encrypted tunnel between the UE and the ePDG.

At 804, an IKE_SA_INIT package may be transmitted by the ePDG to the UE. The transmission of IKE_SA_INIT package to the UE may serve to establish an encrypted tunnel between the UE and the ePDG. The IKE_SA_INIT package is part of standard EAP-AKA and EAP-SIM protocols, a detailed description of which may be found in, e.g., RFC 7296. It may be appreciated that all of the subsequent communications between the UE and the ePDG from steps 806-820 may be encrypted by the encrypted tunnel.

At 806, an IKE_AUTH IDi packet may be transmitted by the UE to the ePDG with an anonymous username starting with "0" or "1". If it is desirable to use prefix values other than "0" or "1", this may be configured with the EAP client. For example, if the network needs the prefix to be "999" then this may be configured with the EAP client.

At 808, an IKE_AUTH EAP Request/Identity packet may be transmitted by the ePDG to the UE. The EAP Request/Identity message may serve to initiate an identity authentication process of the UE.

At 810, an IKE_AUTH EAP Response/Identity packet may be transmitted by the UE via the ePDG to the 3GPP AAA Server 100 with an anonymous username starting with "0" or "1" to help the network route the EAP authentication to the appropriate AAA server that supports EAP-AKA or EAP-SIM, respectively. If it is desirable to use prefix values other than "0" or "1", this may be configured with the EAP client. For example, if the network needs the prefix to be "999" then this may be configured with the EAP client so that it may send a EAP-Response/Identity packet with identity "999" <anonymous>@<NAIrealm>. Use of this prefix value may be limited to the EAP-Response/Identity packet.

At 812, an EAP Request/AKA-Identity packet may be transmitted by the 3GPP AAA Server via the ePDG to the UE. The EAP Request/AKA-Identity packet may comprise an "AT_ANY_ID_REQ" attribute. The EAP Request/AKA message may serve to initiate an identity authentication process of the UE. The AT_ANY_ID_REQ attribute may request an encrypted IMSI from the UE.

At 814, an IKE_AUTH EAP Response/AKA Identity packet that contains the encrypted identity (e.g., an encrypted IMSI or another encrypted identity) may be transmitted by the UE via the ePDG to the 3GPP AAA Server. In the example shown in FIG. 8, the EAP Response/AKA Identity packet may comprise an AT_IDENTITY attribute, wherein the encrypted IMSI is communicated in the form AT_IDENTITY="\0"|<encrypted identity>.

At 816, an EAP Request/AKA Challenge packet comprising AT_RAND, AT_AUTN, and AT_MAC attributes may be transmitted by the 3GPP AAA Server via the ePDG to the UE. These attributes are part of standard EAP-AKA and EAP-SIM protocols, and descriptions thereof may be found in, e.g., RFC 4186 and RFC 4187.

At 818, an IKE_AUTH EAP Response/AKA Challenge packet comprising AT_RES and AT_MAC attributes may be transmitted by the UE via the ePDG to the 3GPP AAA Server. These attributes are part of standard EAP-AKA and EAP-SIM protocols, and descriptions thereof may be found in, e.g., RFC 4186 and RFC 4187.

At 820, an EAP Success message may be transmitted by the 3GPP AAA Server to the ePDG indicating the success of the authorization process, followed by the ePDG transmitting an IKE_AUTH EAP Success message to the UE.

At 822, an IKE_AUTH message may be transmitted by the UE to the ePDG, and at 824 an IKE_AUTH message may be transmitted by the ePDG to the UE, whereby an iWLAN/IPsec tunnel will be established between the UE and the ePDG.

Figure 9:
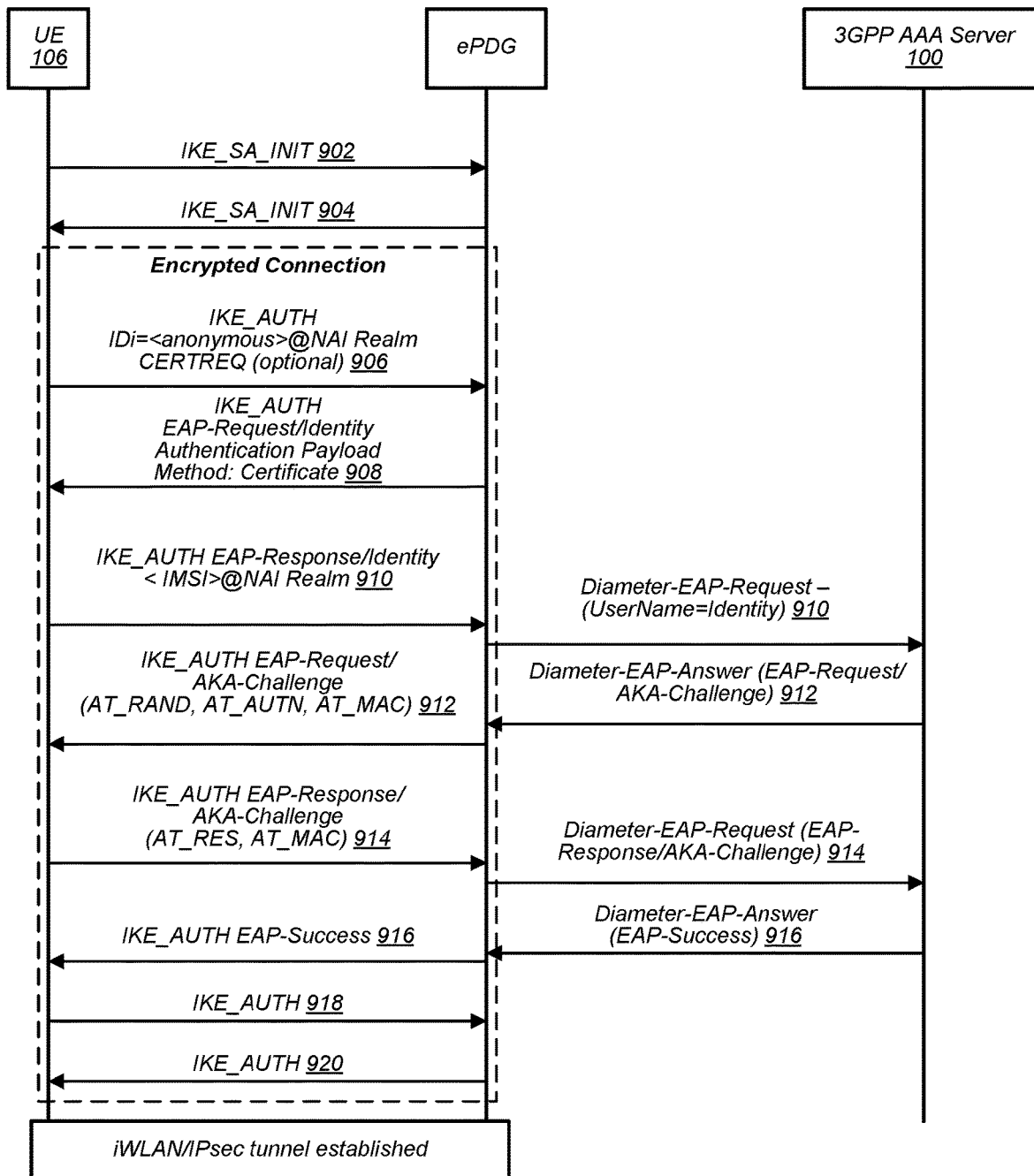
FIG. 9 is a communication flow diagram showing an exemplary identity protection process using server certificates in the case of Wi-Fi calling, according to some embodiments.

FIG. 9—Wi-Fi Calling IKEv2 Solution for Privacy Protection

FIG. 9 is a message flow diagram showing identity protection without using an encrypted IMSI in the case of Wi-Fi calling using an Internet Key Exchange version 2 (IKEv2) protocol. In some embodiments, it may be desirable to accomplish identity protection for a UE when initiating Wi-Fi calling without involving the 3GPP AAA server in each step of the authentication process and an out of band mechanism to manage the public keys for encryption and decryption of the IMSI. For example, in the flowchart of FIG. 8, the ePDG functions in large part as a pass-through entity, as it primarily forwards messages between the UE and 3GPP AAA Server. If some of the authentication steps can be performed directly between the UE and the ePDG (e.g., without directly involving the AAA server), the authentication process may be streamlined and simpler to deploy.

In some embodiments, the IMSI may be provided within the encrypted tunnel only after authenticating the IKEv2 server.

At 902, an IKE_SA_INIT package may be transmitted by the UE 106 (e.g., the UE may be an IKEv2 client) to the ePDG. A detailed description of the communication system between the UE and the ePDG may be found above in the description of FIG. 4. The UE may be used by an EAP client, in some embodiments. The IKE_SA_INIT package may serve to request an encrypted tunnel between the UE and the ePDG.

At 904, an IKE_SA_INIT package may be transmitted by the ePDG to the UE. The transmission of IKE_SA_INIT package to the UE may serve to establish an encrypted connection between the UE and the ePDG. The IKE_SA_INIT package may be part of standard EAP-AKA and EAP-SIM protocols, a detailed description of which may be found in, e.g., RFC 7296. It may be appreciated that all of the subsequent communications between the UE and the ePDG from steps 906-920 may be encrypted by the encrypted connection.

At 906, an IKE_AUTH Di package may be transmitted by the UE to the ePDG with an anonymous username. For example, the IKE_AUTH IDi packet may be structured as "<anonymous>@<NAIrealm>". The anonymous username may be carrier configurable, such that each anonymous username corresponds to a particular wireless carrier. In some embodiments, the UE may be preconfigured with one or more anonymous IDs, which each correspond to a particular wireless carrier. For example, the UE may be pre-configured with a carrier bundle that is stored in a carrier settings file of the UE, which stores the anonymous IDs and associated wireless carriers. In these embodiments, the anonymous username may serve to inform the ePDG which wireless carrier the UE is attempting to use to establish the Wi-Fi call, so that the ePDG knows which AAA server to contact during the authentication process. In other words, the anonymous username may function as a server identifier, which informs the ePDG which server certificate to send to the UE.

In some embodiments, an excessively large certificate size may lead to undesirable IP fragmentation. In these embodiments, the methods herein may be configured to have support for RFC 7383 as way of performing fragmentation of large messages by IKEv2. In these embodiments, a large message (e.g., a large server certificate) may be replaced with a series of smaller messages.

In some embodiments, the IKE_AUTH IDi package may optionally include a certification request message (CERTREQ). The CERTREQ may inform the ePDG that the UE is configured to accept a server certificate, according to the steps below. In some embodiments, the UE may be configured to send a CERTREQ on a server by server basis (e.g., the UE may only send a CERTREQ when establishing a Wi-Fi call with a server that requires a CERTREQ be sent). In some embodiments, the ePDG may employ an alternative authentication method if it is determined that the UE is not configured to accept a server certificate. For example, the ePDG may fallback to a standard authentication method, or the ePDG may employ an authentication method that uses an encrypted IMSI, as detailed elsewhere in this disclosure.

In some embodiments, at 908, the ePDG may respond to the received IKE_AUTH IDi packet by sending an IKE- _AUTH response EAP Request/AKA Identity packet to the UE. The EAP Request/AKA message may serve to initiate an identity authentication process of the UE. The EAP Request/AKA Identity packet may contain an authentication payload, which may include a server certificate. The server certificate may be a unique identifier (e.g., a string of symbols or numbers) that uniquely identifies the 3GPP AAA Server that will be involved in the Wi-Fi call. In some embodiments, the server certificate may be issued by a Certificate Authority (CA). In some embodiments, the UE may be preconfigured (e.g., in a carrier settings file) with one or more server certificates that respectively correspond to one or more AAA servers. For example, the UE may be preconfigured with a carrier bundle that is stored in a carrier settings file of the UE, which stores the server certificates and associated AAA servers. In various embodiments, the carrier bundle containing the server certificates may be the same carrier bundle or a different carrier bundle as that which served to configure the UE with anonymous IDs associated with one or more wireless carriers.

At 910, the UE may compare the received server certificate with the preconfigured server certificate associated with the server through which the UE is attempting to establish a Wi-Fi call. If the received server certificate matches the server certificate in the carrier settings of the UE, the UE may transmit an IKE_AUTH EAP Response/Identity packet that contains the IMSI to the ePDG, which may in turn be forward to the 3GPP AAA Server as a Diameter-EAP-Request packet (e.g., using a DIAMETER protocol) with the UserName serving as the identity. In the example shown in FIG. 9, the EAP Response/AKA Identity packet may communicate an IMSI (or another identifier) in the form <IMSI>@NAI Realm. Because the UE has received a valid server certificate from the ePDG before it sends the IMSI, the UE can be sure that the endpoint is a valid ePDG and not an active attacker.

At 912, an EAP Request/AKA Challenge packet (e.g., a Diameter-EAP-Answer) comprising AT_RAND, AT_AUTN, and AT_MAC attributes may be transmitted by the 3GPP AAA Server via the ePDG to the UE. These attributes are part of standard EAP-AKA and EAP-SIM protocols, and descriptions thereof may be found in, e.g., RFC 4186 and RFC 4187.

At 914, an IKE_AUTH EAP Response/AKA Challenge packet comprising AT_RES and AT_MAC attributes may be transmitted by the UE to the ePDG which may be forwarded to the 3GPP AAA Server as a Diameter-EAP-Request packet. These attributes are part of standard EAP-AKA and EAP-SIM protocols, and descriptions thereof may be found in, e.g., RFC 4186 and RFC 4187.

At 916, an EAP Success message may be transmitted as a Diameter-EAP-Answer by the 3GPP AAA Server to the ePDG indicating the success of the authorization process, followed by the ePDG transmitting an IKE_AUTH EAP Success message to the UE.

At 918, an IKE_AUTH message may be transmitted by the UE to the ePDG, and at 920 an IKE_AUTH message may be transmitted by the ePDG to the UE, whereby an iWLAN/IPsec tunnel will be established between the UE and the ePDG.

The following numbered paragraphs describe additional embodiments of the invention.

In one embodiment, a method is described for performing an authentication procedure between a user equipment device (UE) and an authentication server. The method comprises transmitting a first server certificate from a Packet Data Gateway (PDG) to the UE through a WLAN access point. The UE compares the first server certificate with a second server certificate stored on the UE, wherein the second server certificate is associated with the authentication server.

In this embodiment, in response to a determination that the first server certificate matches the second server certificate, the UE communicates, via the WLAN access point, an International Mobile Subscriber Identity (IMSI) associated with the UE to the PDG for forwarding to the authentication server.

In one embodiment, the UE sends a server identifier to the PDG, wherein the server identifier is associated with the authentication server, and wherein the first server certificate is transmitted in response to the PDG receiving the server identifier.

In one embodiment, the server identifier comprises a certificate request indicating that the UE is configured to receive the first server certificate.

In one embodiment, the authentication procedure enables a Wi-Fi call with a remote party using an Internet Key Exchange version 2 (IKEv2) protocol.

In one embodiment, the UE is configured to connect to the WLAN access point to transmit packetized voice data through the WLAN access point to a cellular packet data gateway;

In one embodiment, the authentication procedure is performed while the UE is connected to the WLAN access point.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
wireless communication circuitry communicatively coupled to the at least one antenna, wherein the wireless communication circuitry is configured to communicate with a first radio access network; and
at least one processor communicatively coupled to the wireless communication circuitry,
wherein the UE is configured to:
perform an initial authentication procedure with a third generation partnership project (3GPP) network through the first radio access network, wherein, in performing the initial authentication procedure, the UE is configured to:
encrypt an International Mobile Subscriber Identity (IMSI); and
transmit the encrypted IMSI in an encoding format to the 3GPP network via the first radio access network, wherein the encoding format comprises a public Key Identifier that was used in generating the encrypted IMSI.

2. The UE of claim 1, wherein the communication of the UE with the 3GPP network uses one of either the EAP-AKA or EAP-SIM protocols.

3. The UE of claim 1, wherein the IMSI is not sent without encryption from the UE via the first radio access network during the authentication procedure or subsequent authentication procedures.

4. The UE of claim 1, wherein the UE is configured to connect to the first radio access network to transmit packetized voice data through the first radio access network to a cellular packet data gateway;
wherein the UE is configured to perform the authentication procedure during connection to the first radio access network.

5. The UE of claim 1,
wherein the UE is configured to store a pseudonym used for communication through the first radio access network to the 3GPP network, and
wherein the initial authentication procedure is performed in response to expiration of the pseudonym.

6. The UE of claim 1, wherein encrypting the IMSI comprises using a public and private key pair.

7. The UE of claim 1, wherein the UE is further configured to:
perform subsequent authentication procedures after the initial authentication procedure, wherein the IMSI is encrypted to a unique encrypted IMSI at each subsequent authentication procedure.

8. The UE of claim 1, wherein the 3GPP network comprises a 3GPP network entity for performing authentication.

9. The UE of claim 1, wherein the 3GPP network comprises a 5G network.

10. The UE of claim 1, wherein the first radio access network is coupled to the 3GPP network via an interface, wherein the UE establishes an encrypted tunnel with the interface prior to transmitting the encrypted IMSI to the 3GPP network via the first radio access network, and wherein the transmission uses the encrypted tunnel.

11. A third generation partnership project (3GPP) network entity for performing authentication, comprising:
at least one network connection configured to communicate with a first radio access network;
a memory medium; and
at least one processor coupled to the memory medium and the at least one network connection, wherein the 3GPP network entity is configured to:
perform initial authentication on a user equipment device (UE) through the first radio access network, said initial authentication comprising:
receiving an encrypted International Mobile Subscriber Identity (IMSI) in an encoding format from the UE via the first radio access network, wherein the encoding format comprises a public Key Identifier that was used in generating the encrypted IMSI;
decrypting the IMSI received from the UE; and
authenticating the UE based on the decrypted IMSI.

12. The 3GPP network entity of claim 9,
wherein the 3GPP network entity is configured to receive a pseudonym from the wireless device through the first radio access network;
wherein the authentication is performed in response to expiration of the pseudonym.

13. The 3GPP network entity of claim 9, wherein the IMSI is encrypted using a public and private key pair.

14. The 3GPP network entity of claim 9, wherein the 3GPP network entity is further configured to:
perform subsequent authentications after the initial authentication is performed, wherein the IMSI is encrypted to a unique encrypted IMSI at each subsequent authentication.

15. A user equipment device (UE), comprising:
at least one antenna;
wireless communication circuitry communicatively coupled to the at least one antenna, wherein the wireless communication circuitry is configured to communicate with a first radio access network, wherein the first radio access network is a non-third generation partnership project (non-3GPP) access network, and wherein the first radio access network is coupled to a third generation partnership project (3GPP) network through an interface; and
at least one processor communicatively coupled to the wireless communication circuitry;
wherein the UE is configured to perform an initial authentication procedure with the 3GPP network through the first radio access network, wherein in performing the initial authentication procedure, the UE is configured to:
exchange an internet key exchange (IKE) security association (SA) initial (INIT) package with the interface through the first radio access network;
after exchanging the IKE SA INIT package, receive a first server certificate from the interface through the first radio access network;
send a server identifier to the interface, wherein the server identifier is associated with the 3GPP network, and wherein the first server certificate is received in response to sending the server identifier;
determine the first server certificate is valid; and
in response to a determination that the first server certificate is valid, transmit, via the first radio access network, an identity associated with the UE to the interface for forwarding to the 3GPP network, wherein the identity comprises an encrypted International Mobile Subscriber Identity (IMSI) in an encoding format, wherein the encoding format comprises a public Key Identifier that was used in generating the encrypted IMSI.

16. The UE of claim 15,
wherein the server identifier comprises a certificate request indicating that the UE is configured to receive the first server certificate, and
wherein the first server certificate is fragmented into a series of smaller messages.

17. The UE of claim 15, wherein the initial authentication procedure enables a Wi-Fi call with a remote party.

18. The UE of claim 15, wherein the initial authentication procedure uses an Internet Key Exchange version 2 (IKEv2) protocol between the UE and the interface.

19. The UE of claim 15, wherein the UE is configured to connect to the first radio access network to transmit packetized voice data through the first radio access network to a cellular packet data gateway;
wherein the UE is configured to perform the initial authentication procedure during connection to the first radio access network.

20. The UE of claim 15, wherein determining the first server certificate is valid comprises comparing the first server certificate with a second server certificate stored on the UE, and wherein the second server certificate is associated with the 3GPP authentication server.

* * * * *